(12) United States Patent
Agarwal et al.

(10) Patent No.: US 9,646,061 B2
(45) Date of Patent: May 9, 2017

(54) DISTRIBUTED FUZZY SEARCH AND JOIN WITH EDIT DISTANCE GUARANTEES

(71) Applicant: International Business Machines Corporation, Armonk, NY (US)

(72) Inventors: Manoj Kumar Agarwal, Noida (IN); Rajeev Gupta, Noida (IN)

(73) Assignee: International Business Machines Corporation, Armonk, NY (US)

( * ) Notice: Subject to any disclaimer, the term of this patent is extended or adjusted under 35 U.S.C. 154(b) by 290 days.

(21) Appl. No.: 14/603,200

(22) Filed: Jan. 22, 2015

(65) Prior Publication Data

US 2016/0217186 A1 Jul. 28, 2016

(51) Int. Cl.
*G06F 17/30* (2006.01)

(52) U.S. Cl.
CPC .. *G06F 17/30542* (2013.01); *G06F 17/30312* (2013.01); *G06F 17/30498* (2013.01)

(58) Field of Classification Search
None
See application file for complete search history.

(56) References Cited

U.S. PATENT DOCUMENTS

| | | | | |
|---|---|---|---|---|
| 5,459,739 A | * | 10/1995 | Handley | G06K 9/6292 382/310 |
| 7,444,326 B1 | * | 10/2008 | Jagadish | G06F 17/30637 |
| 7,996,369 B2 | | 8/2011 | Li et al. | |
| 8,175,387 B1 | * | 5/2012 | Hsieh | G06K 9/6206 382/181 |
| 8,224,830 B2 | | 7/2012 | Bidlack | |
| 8,775,441 B2 | | 7/2014 | Anderson | |
| 9,529,824 B2 | * | 12/2016 | Tusk | G06F 17/30247 |
| 2004/0220920 A1 | * | 11/2004 | Bax | G06F 7/02 |
| 2005/0267885 A1 | * | 12/2005 | Klier | G06F 17/2211 |
| 2008/0114722 A1 | * | 5/2008 | Rabani | G06F 17/30684 |
| 2010/0010989 A1 | * | 1/2010 | Li | G06F 17/30675 707/E17.017 |

(Continued)

OTHER PUBLICATIONS

Deng, Dong, et al, "Top-k String Similarity Search with Edit-Distance Constraints", 29th International Conference on Data Engineering (ICDE), Apr. 8-12, 2013, Brisbane, Queensland, Australia, pp. 925-936, IEEE Digital Library.

(Continued)

*Primary Examiner* — Hung Le
(74) *Attorney, Agent, or Firm* — Ference & Associates LLC

(57) ABSTRACT

Methods and arrangements performing fuzzy search. A contemplated method includes: establishing an edit distance threshold for the fuzzy search; generating an index of items to be searched, via: storing at least one string; and creating substrings corresponding to the at least one string; providing a query string for use in searching; creating substrings corresponding to the query string; comparing substrings of the query string with substrings in the index; designating at least one candidate string based on said comparing; verifying whether each candidate string satisfies the edit distance threshold; and outputting at least one matching string for each candidate string that satisfies the edit distance threshold. Other variants and embodiments are broadly contemplated herein.

20 Claims, 4 Drawing Sheets

| ID | String |
|---|---|
| 1 | sarit |
| 2 | seraji |
| 3 | suijt |
| 4 | suit |
| 5 | surajit |
| 6 | thrifty |

(56) References Cited

U.S. PATENT DOCUMENTS

2014/0297356 A1* 10/2014 Jayade ............ G06Q 10/06316
  705/7.26
2016/0103906 A1* 4/2016 Li .................... G06F 17/30616
  707/742

OTHER PUBLICATIONS

Deng, Dong, et al, "MassJoin: A MapReduce-based Method for Scalable String Similarity Joins", 30th International Conference on Data Engineering (ICDE), Mar. 31-Apr. 4, 2014, Chicago, Illinois, USA, pp. 340-351, IEEE Digital Library.

Boytsov, Leonid, "Indexing Methods for Approximate Dictionary Searching: Comparative Analysis" Journal of Experimental Algorithmics (JEA), May 2011, 91 pages, vol. 16, No. 1, Article 1, ACM Digital Library.

* cited by examiner

DISTRIBUTED FUZZY SEARCH AND JOIN WITH EDIT DISTANCE GUARANTEES

BACKGROUND

As is generally known, fuzzy search involves a manner of searching where two strings (contiguous groupings of characters) are considered to be matched if their differences lie within predetermined bounds. Thus, an exact match is not essential as long as, e.g., two strings are similar within a predetermined quantitative parameter. Such a parameter, which can quantify differences between strings, could be represented by edit distance. Edit distance indicates how many edit operations would be required to convert one string to another; atomic edit operations used in such a calculation can include, e.g., adding or deleting a character, or replacing a character. Thus, the edit distance between "cat" and "cart" is 1, as it is between "cat" and "can", or "cat" and "at". Generally, for given strings of size $n_1$ and $n_2$, edit distance calculation can be done in $O(n_1 n_2)$ using a conventional dynamic programming algorithm.

Fuzzy search, which can be considered to include fuzzy matching, may be of use in a variety of instances, such as in entity resolution. In entity resolution, an identification is made of an instance of an entity mentioned in a structured record or unstructured document; thus, fuzzy matching can be of help when accommodating unstructured documents that may be of low quality (e.g., may include various typographical errors).

Distributed parallel computing provides another viable platform for fuzzy search. Here, processing tasks are generally dispersed across multiple processors operating on one or more computing devices such that parallel processing may be executed simultaneously. Important implementations of large scale distributed parallel computing systems are MapReduce by Google®, Dryad by Microsoft®, and the open source Hadoop® MapReduce implementation. (Google® is a registered trademark of Google Inc. Microsoft® is a registered trademark of the Microsoft Corporation in the United States, other countries, or both. Hadoop® is a registered trademark of the Apache Software Foundation.) Here, different machines may each process part of a query independently, with results then being aggregated. One application thus arising here involves fuzzy join, where principles similar to those used in fuzzy search are employed.

Generally, conventional methods and arrangement have fallen short in providing an efficient manner of fuzzy match or fuzzy join that avoids the considerable generation of superfluous results.

BRIEF SUMMARY

In summary, one aspect of the invention provides a method of performing a fuzzy search, said method comprising: utilizing at least one processor to execute computer code configured to perform the steps of: providing a query string for searching against an index of items to be searched, the query string comprising a continuous grouping of characters; establishing an edit distance threshold for the searching, to guide a return of search results wherein an edit distance between the query string and each search result is less than or equal to the edit distance threshold; generating the index of items to be searched, via: providing strings to be searched against, each of the strings comprising a contiguous grouping of characters; and creating substrings corresponding to the strings to be searched against, the substrings comprising portions of the strings to be searched against; creating substrings corresponding to the query string, the substrings of the query string comprising portions of the query string; comparing substrings of the query string with substrings in the index; designating at least one candidate string based on said comparing; verifying whether each candidate string satisfies the edit distance threshold; and outputting at least one matching string for each candidate string that satisfies the edit distance threshold.

Another aspect of the invention provides an apparatus for performing fuzzy search, said apparatus comprising: at least one processor; and a computer readable storage medium having computer readable program code embodied therewith and executable by the at least one processor, the computer readable program code comprising: computer readable program code configured to provide a query string for searching against an index of items to be searched, the query string comprising a continuous grouping of characters; computer readable program code configured to establish an edit distance threshold for the searching, to guide a return of search results wherein an edit distance between the query string and each search result is less than or equal to the edit distance threshold; computer readable program code configured to generate the index of items to be searched, via: providing strings to be searched against, each of the strings comprising a contiguous grouping of characters; and creating substrings corresponding to the strings to be searched against, the substrings comprising portions of the strings to be searched against; computer readable program code configured to create substrings corresponding to the query string, the substrings of the query string comprising portions of the query string; computer readable program code configured to compare substrings of the query string with substrings in the index; computer readable program code configured to designate at least one candidate string based on said comparing; computer readable program code configured to verify whether each candidate string satisfies the edit distance threshold; and computer readable program code configured to output at least one matching string for each candidate string that satisfies the edit distance threshold.

A further aspect of the invention provides a computer program product for performing fuzzy search, said computer program product comprising: a computer readable storage medium having computer readable program code embodied therewith, the computer readable program code comprising: computer readable program code configured to provide a query string for searching against an index of items to be searched, the query string comprising a continuous grouping of characters; computer readable program code configured to establish an edit distance threshold for the searching, to guide a return of search results wherein an edit distance between the query string and each search result is less than or equal to the edit distance threshold; computer readable program code configured to generate the index of items to be searched, via: providing strings to be searched against, each of the strings comprising a contiguous grouping of characters; and creating substrings corresponding to the strings to be searched against, the substrings comprising portions of the strings to be searched against; computer readable program code configured to create substrings corresponding to the query string, the substrings of the query string comprising portions of the query string; computer readable program code configured to compare substrings of the query string with substrings in the index; computer readable program code configured to designate at least one candidate string based on said comparing; computer readable program code configured to verify whether each candidate string satisfies the edit distance threshold; and computer readable program code configured to output at least one matching string for each candidate string that satisfies the edit distance threshold.

An additional aspect of the invention provides a method comprising: providing a query string for searching against an index of items to be searched, the query string comprising a continuous grouping of characters; establishing an edit distance threshold for the searching, to guide a return of search results wherein an edit distance between the query string and each search result is less than or equal to the edit distance threshold; generating the index of items to be searched, via: providing strings to be searched against, each of the strings comprising a contiguous grouping of characters; and creating substrings corresponding to the strings to be searched against, the substrings comprising portions of the strings to be searched against; creating substrings corresponding to the query string, the substrings of the query string comprising portions of the query string; comparing substrings of the query string with substrings in the index, and finding an exact match of a substring of the query string with a substring in the index; designating at least one candidate string based on said comparing; wherein said designating of at least one candidate string comprises designating a string in the index as a candidate string when a substring thereof represents an exact match with a substring of the query string; verifying whether each candidate string satisfies the edit distance threshold; and outputting at least one matching string for each candidate string that satisfies the edit distance threshold; said creating of substrings corresponding to the strings to be searched against comprising: partitioning one of the strings to be searched against into substrings; iteratively padding the one of the strings to be searched against with at least one dummy character up to a predetermined maximum number of dummy characters, to produce one or more padded strings; and partitioning each of the one or more padded strings into substrings; and said creating of substrings corresponding to the query string comprising: partitioning the query string into substrings; iteratively padding the query string with at least one dummy character up to the predetermined maximum number of dummy characters, to produce and one or more padded strings of the query string; and partitioning each of the one or more padded strings of the query string into substrings.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

Figure 1:
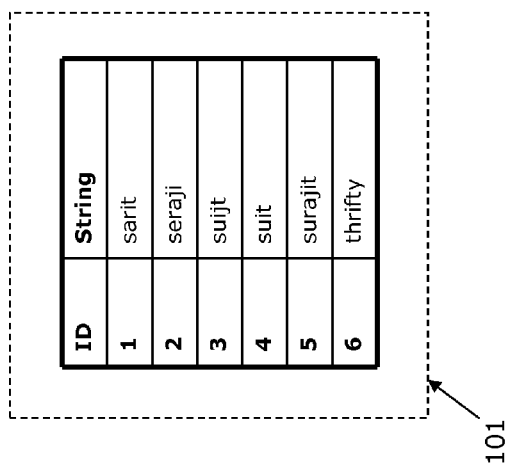
FIG. 1 provides an example of a data store of strings for use in a fuzzy search.

Specific reference will now be made here below to FIG. 1-3. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 4. In accordance with an exemplary embodiment, most if not all of the process steps, components and outputs discussed with respect to FIGS. 1-3 can be performed or utilized by way of a processing unit or units and system memory such as those indicated, respectively, at 16' and 28' in FIG. 4, whether on a server computer, a client computer, a node computer in a distributed network, or any combination thereof.

Broadly contemplated herein, in accordance with at least one embodiment of the invention, are methods and arrangements which provide systems and methods involving the fuzzy matching of strings with approximation guarantees, in the form of edit distance, wherein an index is created over strings, and the index maps substrings to strings based on the specified guaranteed edit distance. As such, in accordance with at least one embodiment of the invention, substrings of the query string are created wherein: if any of the substrings match with a stored string, edit distance is calculated between the query string and the matching stored strings; and, if the edit distance is less than a specified threshold, the stored string becomes part of the result.

Moreover, in accordance with at least one embodiment of the invention, there are broadly contemplated herein systems and methods of distributed fuzzy join, wherein substrings of a join string are created as map-keys, and strings with the same map-keys are compared for edit distance at a reduce stage. As such, in accordance with at least one embodiment of the invention, if two strings are likely to match with more than one substring, the edit distance between strings is obtained only at one reducer.

The features discussed above, and others, relating to at least one embodiment of the invention, will be better appreciated from the discussion which follows.

Generally, in accordance with a general background relative to at least one embodiment of the invention, fuzzy search using edit distance guarantees can proceed as follows. An edit distant threshold $\lambda$ can be established to limit the number of search results, such that only results at an edit distance less than or equal to $\lambda$ will ultimately be returned. Consider stored data which, by way of a merely illustrative example, includes a table of six strings (101) as shown in FIG. 1. If an input query is represented as q="srajit", and the edit distance threshold $\lambda$ is 2, then q should match {"surajit", "seraji", and "sarit"}, which present edit distances of 1, 2 and 2, respectively. At every stage of edit distance calculation (i.e., edit distance between sub-strings of the query string and of a stored string), given strings can be shifted to obtain an optimal match. Thus, if the query string (q) "srajit" is so explored with respect to "surajit" (fifth entry in table 101), a substring "rajit" of q and a substring "urajit" (from "surajit") will match with edit distance 1 if "rajit" is understood to be shifted by 1 space to right. Fuzzy search of this type can be used in a great variety of domains, such as entity resolution and DNA sequence matching.

In accordance with a general background relative to at least one embodiment of the invention, fuzzy search can be employed with the aid of an index. This can be of use when edit distance needs to be calculated with respect to a large number of strings, thus indices can be used to filter out strings which are not likely to match. As such, an index is created of records (in the form of strings), against which a query string is checked. Particularly, an equality match (i.e., wherein one of the substrings of query strings is same as the key of the index) is sought during this particular search and an edit distance is calculated only between the query string and strings returned by such an index search.

In accordance with a general background relative to at least one embodiment of the invention, an n-gram index could well be created for a fuzzy search which uses an index. Essentially, an n-gram is a continuous (consecutive) sequence of n items from a given sequence of text or speech. Thus, any given string can be converted into a set of n-grams. For instance, the result of converting "sarit" into a set of 3-grams is: {"sar", "ari", "rit"}. An index can then be created via mapping n-grams to strings (e.g., "sar"→"sarit", "saroj", "panesar"), whereupon two strings are compared for edit distance only if they share at-least one n-gram. Thus q="srajit" would not be compared against "thrifty".

However, in accordance with a general background relative to at least one embodiment of the invention, problems can be encountered with an arrangement such as that just described. Mainly, such an arrangement represents an ad-hoc method without any guarantee on edit distance threshold. For instance, "srajit" does not match with "sarit" (using 3-grams) even though their edit distance is 2. Further, it can only provide guarantee for a given string; e.g., for a string of length m and n=3, one can guarantee that it will catch all the strings with edit distance≤m/3 and yet, for a string of size m, there are yielded (m−n) n-grams. For an edit distance threshold $\lambda$, it is thus then not clear as to what the value of n should be, for each n-gram index. Further, many frivolous matches may be yielded in that a string of size m cannot match with any string of size>m+$\lambda$ and size<m−$\lambda$. As such, it still becomes necessary to calculate edit distances of such frivolously matched strings.

In accordance with at least one embodiment of the invention, at least by way of overcoming challenges such as those discussed hereabove and others, an indexing approach can be employed that also includes filtering and validation. Further, and as will be better appreciated hereinbelow, indexed strings can be padded with one or more dummy characters as a basis for creating additional substrings. As such, for each stored string and padded string, a number of index entries are created, wherein sub-strings of each string are mapped to the corresponding stored string. For a query string, sub-strings are similarly created, and these substrings are then are searched in the index (itself comprising initially stored strings, along with sub-strings of each stored string). The index then returns candidate strings corresponding to the matching sub-strings. At that point only these candidate strings need to be validated, to verify which of them may lie within a predetermined edit distance threshold, and then any strings so validated then are output as matching strings. This method ensures that one obtains all stored strings which lie within a given edit distance to the query string.

In accordance with at least one embodiment of the invention, by way of an illustrative working example, and consistent with the process just described, a map-reduce method for fuzzy join involves creating sub-strings and using the same as map keys. All strings having at least one common sub-string are then collected at a reducer, which can then verify whether the strings present an edit distance within a predetermined edit distance threshold.

To build on the foregoing, in accordance with at least one embodiment of the invention, an algorithm for deriving sub-strings guarantees that an index will not miss any string with an edit distance less than or equal to $\lambda$. Accordingly, the number of strings to be matched for index-based solutions such as those just described (i.e., where strings are pre-filtered using equality based indexing) is kept to a minimum. As such, the algorithm ensures that two strings of equal length have at least one substring in common if their edit distance is likely to be less than or equal to $\lambda$, and to this end there are created at least ($\lambda$+1) partitions of equal length for each string. Further, a string of length m can only match with a string of length m' only if: (m−$\lambda$)≤m'≤(m+$\lambda$). Additionally, there can be at most $\lambda$ shifts during the matching process. (For example, "cat" and "ate" would be matching for an edit distance of 2 involving 1 shift.)

In accordance with at least one embodiment of the invention, the algorithm includes two main steps. In a first step, for any original string of length m, there are generated ($\lambda$+1) or more index entries each of length m/($\lambda$+1) (preferably rounded down to the nearest integer). Entries of a length less than m/($\lambda$+1) are also permissible, especially if the quantity m/($\lambda$+1) is not an integer, though n-grams where n is 1 can preferably be discarded. In the next step, the original string is then "padded" with a predetermined shift of $\alpha$ characters, each shift denoted by "#" (i.e., a dummy character), where (1≤$\alpha$≤$\lambda$); this then yields an additional $\lambda$ index entries of length m/($\lambda$+1). Thus, in the first step mentioned above $\alpha$ can be considered to be zero as there is no presumption of padding or shifting, while in a second step one or more additional stages can then be traversed where $\alpha$ is increased by 1 until it reaches $\lambda$. Once these graduated steps are undertaken any and all entries with padded characters are discarded and do not end up being added to the index. Accordingly, the two steps just mentioned, in total, will yield ($\lambda^2$+$\lambda$+1) index entries for the index.

By way of a working example, in accordance with at least one embodiment of the invention, the following case can be considered. If a string S="subramanium" (i.e., m=11), then λ=2 will yield the following set of steps for adding entries to an index, as α is increased from 0 to 2:

α=0: Subr, aman, ium
α=1: subramanium→# subramanium→rama, nium
α=2: subramanium→## subramanium bram, aniu At the same time, for S="ubramaniums", the following is obtained as α is increased from 0 to 2:

α=0: ubra, mani, ums
α=1: ubramaniums→# ubramaniums→aman, iums
α=2: ubramaniums→## ubramaniums→rama, nium In accordance with at least one embodiment of the invention, in accordance with the above example, it can be noted that several "padded" strings (containing one or more padded characters) are discarded and not added to the index. Thus, for "subramanium", "#sub" and "##su" are created as are "#ubr" and "##ub" for "ubramaniums"; none of these end up being added to the index. As, such, with the substrings that remain available for comparison purposes, substrings of "subramanium" are compared—purely on the basis of an equality match—with respect to substrings of "ubramaniums". It can now be seen that the two original strings noted above share a common index entry corresponding to "rama". On this basis, either one of the original strings can be considered a candidate match for the other, whereupon an edit distance calculation is made; here, since the edit distance (2) clearly meets the threshold of λ=2, either string can then be considered as a match for the other.

Figure 2:
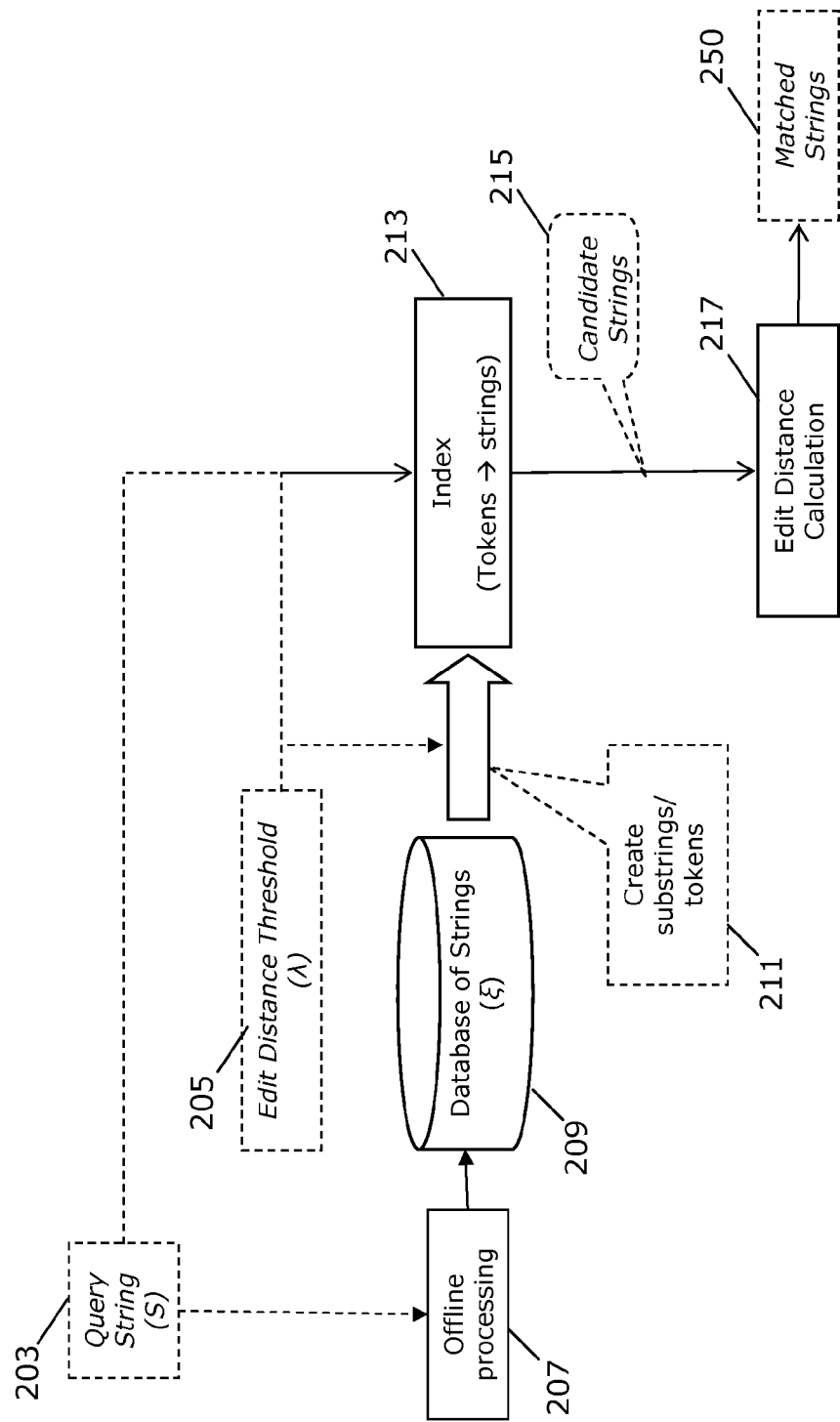
FIG. 2 schematically illustrates a working example of performing fuzzy match.

In accordance with at least one embodiment of the invention, FIG. 2 schematically illustrates a working example for fuzzy match. As shown, there is provided a query string S (203) along with a predetermined edit distance threshold λ (205); by way of example, this query string S can be provided via input from a user, wherein the query string S is received or accepted at a server or other location for further processing. For this query string, a set of λ+1 strings, ξ, is created (via offline processing 207) by appending # (a dummy character) a number of times α before S; these strings are stored in a database 209. In a next step (211), for each element of ξ, λ+1 substrings are created, and all substrings containing any # are then removed to obtain tokens. These tokens are then converted to strings to add to an index (213). A similar process takes place with respect to strings to be stored in index 213, against which the query string S is searched. Thus, strings are provided, at a server or other location, for being stored in the index; as such, these may be input, accepted or received from any suitable source such as a document corpus or a database other than that indicated at 209. Alternatively such strings may be provided via already being present in database 209. However provided, for each such string to be stored in the index 213, similar steps take place as noted above for offline processing (207), storage in a database (209), creation of substrings and tokens (211) and addition to the index (213). It should be understood that the creation of substrings relative to a query string and searchable index strings as noted here just represents one illustrative and non-restrictive example.

In accordance with at least one embodiment of the invention, from the index (213), candidate strings (215) are created and matches can be determined relative to calculated edit distance and to λ. More particularly, candidate strings (215) are obtained by determining any and all exact matches between substrings of the query string S and any of the other entries in the index 213, wherein an original string becomes a candidate string if an exact match "points" to it. From the candidate strings, edit distances relative to the query string S are calculated (217), and those strings fulfilling threshold λ are then determined to represent matched strings, and accordingly are provided as output (250).

Figure 3:
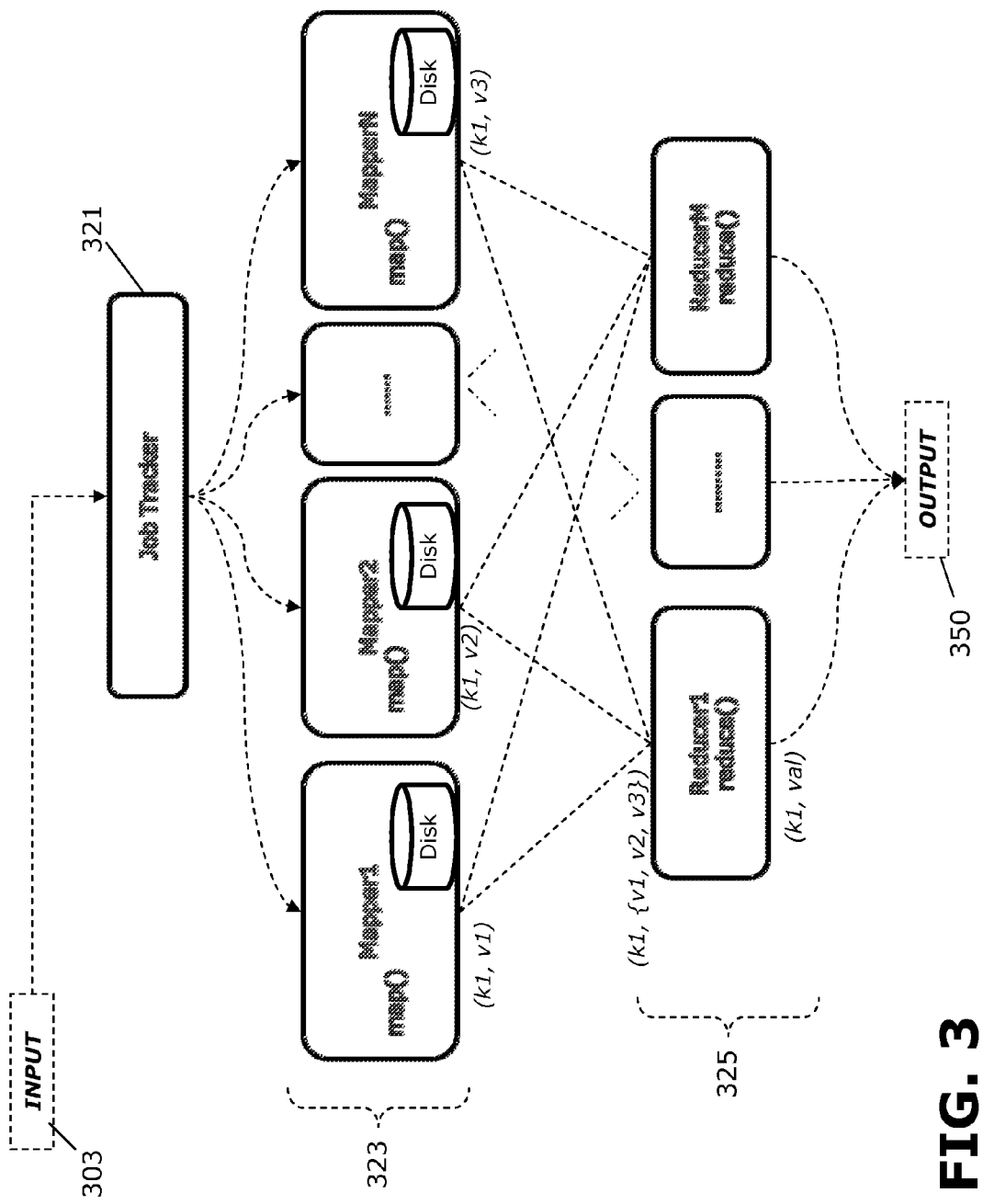
FIG. 3 schematically illustrates a working example involving MapReduce processing.

FIG. 3 schematically illustrates a working example involving MapReduce processing, in accordance with at least one embodiment of the invention. As shown, a distributed network includes a job tracker 321 (associated with a Hadoop file system [HDFS]) The HDFS (job tracker 321) reads input strings S (301); sub-strings are then created at the map phase 323. Local writes to individual nodes then include key/value pairs which comprise a token (key) and a given string S (value). All strings with common sub-strings are then collected and then, at the reduce phase 325, strings are compared for edit distance. Finally, output 350 (via the HDFS) includes an indication of matching strings. Thus, in accordance with the present example, general parallels can be appreciated with respect to the example of FIG. 2.

In brief recapitulation, it can be appreciated from the foregoing that, in accordance with at least one embodiment of the invention, there are provided methods and arrangements for fuzzy string matching with indexing, accompanied by fixed edit distance guarantees. This distinguishes admirably over much more inefficient and unworkable arrangements that otherwise could be contemplated for providing edit distance guarantees. For instance, comparing all strings would yield far too many comparisons as would the use of a 1-gram index (wherein each character of the string is mapped to the string) index.

In further recapitulation, it can be appreciated from the foregoing that there are broadly contemplated herein systems and methods for fuzzy search and join with edit distance guarantees. First, an index of stored strings is created such that a variable length substrings are mapped on to the strings. For fuzzy search, substrings are created from the query string and edit distance threshold. These substrings are searched for equality (i.e., exact matches) in the index. All candidate results are checked for edit distance with respect to the query string to determine whether they constitute final results.

It can be appreciated from the foregoing that, in accordance with at least one embodiment of invention, a technical improvement is represented via provision of systems and methods involving the fuzzy matching of strings with approximation guarantees, in the form of edit distance, wherein an index is created over strings, and the index maps substrings to strings based on the specified guaranteed edit distance, and wherein substrings of the query string are created such that: if any of the substrings match with a stored string, edit distance is calculated between the query string and the matching stored strings; and, if the edit distance is less than a specified threshold, the stored string becomes part of the result.

In accordance with at least one embodiment of the invention, very generally, quantitative values as determined herein, or other data or information as used or created herein, can be stored in memory or displayed to a user on a screen, as might fit the needs of one or more users.

Figure 4:
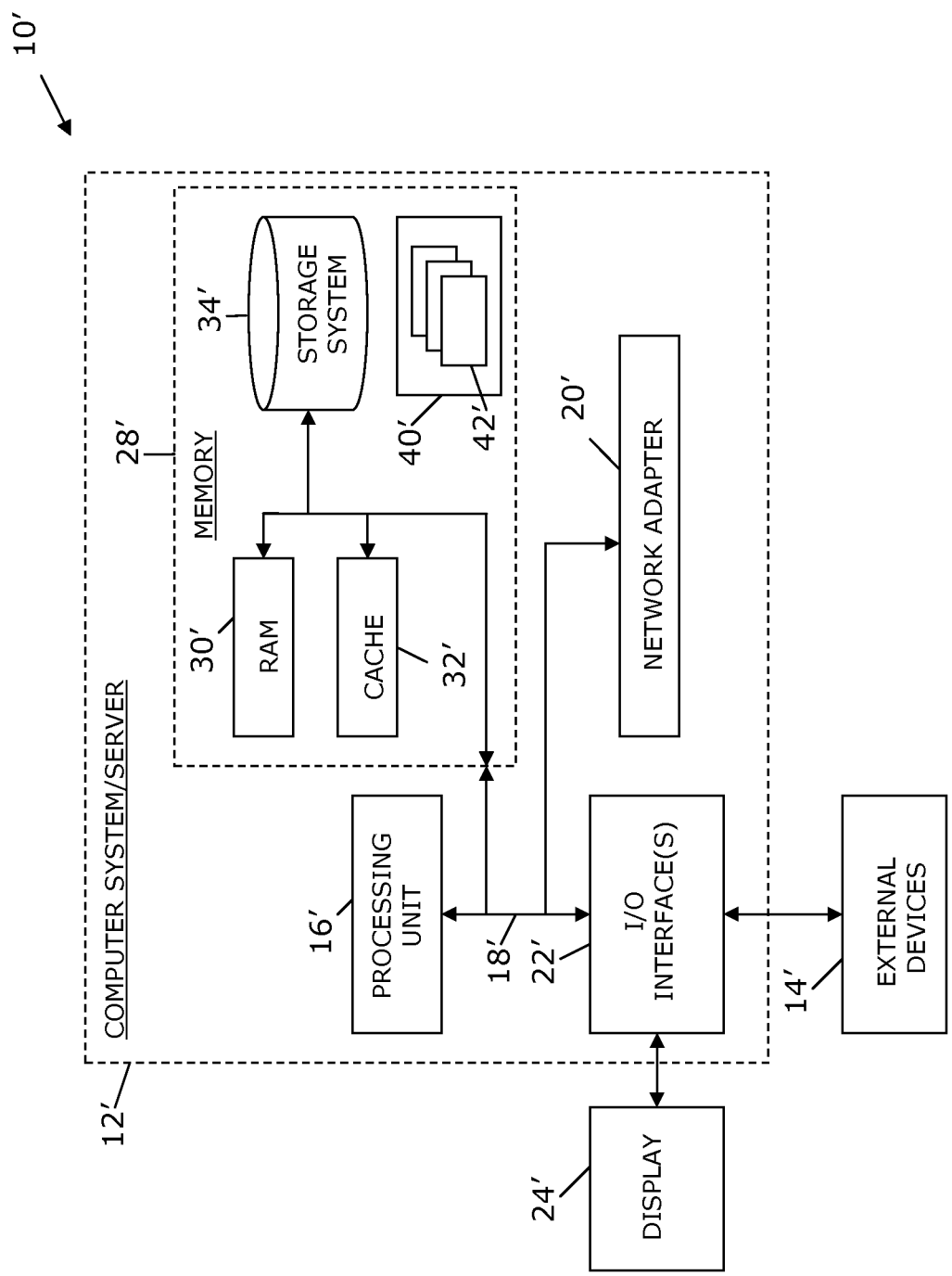
FIG. 4 illustrates a computer system.

Referring now to FIG. 4, a schematic of an example of a cloud computing node is shown. Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove. In accordance with embodiments of the invention, computing node 10' may not necessarily even be part of a cloud network but instead could be part of another type of distributed or other network, or could represent a stand-alone node. For the purposes of discussion and illustration, however, node 10' is variously referred to herein as a "cloud computing node".

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12' in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of performing a fuzzy search, said method comprising:
   utilizing at least one processor to execute computer code configured to perform the steps of:
   providing a query string for searching against an index of items to be searched, the query string comprising a continuous grouping of characters;
   establishing an edit distance threshold for the searching, to guide a return of search results wherein an edit distance between the query string and each search result is less than or equal to the edit distance threshold;
   generating the index of items to be searched, via:
     providing strings to be searched against, each of the strings comprising a contiguous grouping of characters; and
     creating substrings corresponding to the strings to be searched against, the substrings comprising portions of the strings to be searched against;
   creating substrings corresponding to the query string, the substrings of the query string comprising portions of the query string;
   comparing substrings of the query string with substrings in the index;

designating at least one candidate string based on said comparing;

verifying whether each candidate string satisfies the edit distance threshold; and outputting at least one matching string for each candidate string that satisfies the edit distance threshold.

2. The method according to claim 1, wherein said comparing comprises finding an exact match of a substring of the query string with a substring in the index.

3. The method according to claim 2, wherein said designating of at least one candidate string comprises designating a string in the index as a candidate string when a substring thereof represents an exact match with a substring of the query string.

4. The method according to claim 1, wherein said creating of substrings corresponding to the strings to be searched against comprises:

partitioning one of the strings to be searched against into substrings;

iteratively padding the one of the strings to be searched against with at least one dummy character up to a predetermined maximum number of dummy characters, to produce one or more padded strings; and partitioning each of the one or more padded strings into substrings.

5. The method according to claim 4, wherein the predetermined maximum number of dummy characters is equal to the edit distance threshold.

6. The method according to claim 4, wherein said creating of substrings corresponding to the strings to be searched against comprises discarding any substring which contains at least one dummy character.

7. The method according to claim 4, wherein said partitioning of the one of the strings to be searched against comprises predetermining the length of substrings as a rounded-down integer $m/(\lambda+1)$, where m is the length of the initial string and $\lambda$ is the edit distance threshold.

8. The method according to claim 4, wherein said creating of substrings corresponding to the query string comprises:

partitioning the query string into substrings;

iteratively padding the query string with at least one dummy character up to the predetermined maximum number of dummy characters, to produce one or more padded strings of the query string; and partitioning each of the one or more padded strings of the query string into substrings.

9. The method according to claim 8, wherein:

the predetermined maximum number of dummy characters is equal to the edit distance threshold;

said creating of substrings corresponding to the query string comprises discarding any substring of the query string which contains at least one dummy character; and said partitioning of the query string into substrings comprises determining the length of substrings of the query as a rounded-down integer $m/(\lambda+1)$, where m is the length of the query string and $\lambda$ is the edit distance threshold.

10. The method according to claim 1, wherein said creating of substrings corresponding to the query string comprises:

partitioning the query string into substrings;

iteratively padding the query string with at least one dummy character up to the predetermined maximum number of dummy characters, to produce one or more padded strings of the query string; and partitioning each of the one or more padded strings of the query string into substrings.

11. The method according to claim 1, wherein the fuzzy search is performed in a distributed parallel computing environment.

12. The method according to claim 11, comprising a fuzzy join step to consolidate results from individual nodes in the distributed parallel computing environment.

13. An apparatus for performing fuzzy search, said apparatus comprising:

at least one processor; and a computer readable storage medium having computer readable program code embodied therewith and executable by the at least one processor, the computer readable program code comprising:

computer readable program code configured to provide a query string for searching against an index of items to be searched, the query string comprising a continuous grouping of characters;

computer readable program code configured to establish an edit distance threshold for the searching, to guide a return of search results wherein an edit distance between the query string and each search result is less than or equal to the edit distance threshold;

computer readable program code configured to generate the index of items to be searched, via:

providing strings to be searched against, each of the strings comprising a contiguous grouping of characters; and creating substrings corresponding to the strings to be searched against, the substrings comprising portions of the strings to be searched against;

computer readable program code configured to create substrings corresponding to the query string, the substrings of the query string comprising portions of the query string;

computer readable program code configured to compare substrings of the query string with substrings in the index;

computer readable program code configured to designate at least one candidate string based on said comparing;

computer readable program code configured to verify whether each candidate string satisfies the edit distance threshold; and computer readable program code configured to output at least one matching string for each candidate string that satisfies the edit distance threshold.

14. A computer program product for performing fuzzy search, said computer program product comprising:

a computer readable storage medium having computer readable program code embodied therewith, the computer readable program code comprising:

computer readable program code configured to provide a query string for searching against an index of items to be searched, the query string comprising a continuous grouping of characters;

computer readable program code configured to establish an edit distance threshold for the searching, to guide a return of search results wherein an edit distance between the query string and each search result is less than or equal to the edit distance threshold;

computer readable program code configured to generate the index of items to be searched, via:

providing strings to be searched against, each of the strings comprising a contiguous grouping of characters; and creating substrings corresponding to the strings to be searched against, the substrings comprising portions of the strings to be searched against;

computer readable program code configured to create substrings corresponding to the query string, the substrings of the query string comprising portions of the query string;

computer readable program code configured to compare substrings of the query string with substrings in the index;

computer readable program code configured to designate at least one candidate string based on said comparing;

computer readable program code configured to verify whether each candidate string satisfies the edit distance threshold; and computer readable program code configured to output at least one matching string for each candidate string that satisfies the edit distance threshold.

15. The computer program product according to claim 14, wherein the comparing comprises finding an exact match of a substring of the query string with a substring in the index.

16. The computer program product according to claim 15, wherein the designating of at least one candidate string comprises designating a string in the index as a candidate string when a substring thereof represents an exact match with a substring of the query string.

17. The computer program product according to claim 14, wherein the creating of substrings corresponding to the strings to be searched against comprises:
    partitioning one of the strings to be searched against into substrings;
    iteratively padding the one of the strings to be searched against with at least one dummy character up to a predetermined maximum number of dummy characters, to produce one or more padded strings; and
    partitioning each of the one or more padded strings into substrings.

18. The computer program product according to claim 14, wherein the creating of substrings corresponding to the query string comprises:
    partitioning the query string into substrings;
    iteratively padding the query string with at least one dummy character up to the predetermined maximum number of dummy characters, to produce one or more padded strings of the query string; and
    partitioning each of the one or more padded strings of the query string into substrings.

19. The computer program product according to claim 14, wherein the fuzzy search is performed in a distributed parallel computing environment.

20. A method comprising:
providing a query string for searching against an index of items to be searched, the query string comprising a continuous grouping of characters;
establishing an edit distance threshold for the searching, to guide a return of search results wherein an edit distance between the query string and each search result is less than or equal to the edit distance threshold;
generating the index of items to be searched, via:
    providing strings to be searched against, each of the strings comprising a contiguous grouping of characters; and
    creating substrings corresponding to the strings to be searched against, the substrings comprising portions of the strings to be searched against;
creating substrings corresponding to the query string, the substrings of the query string comprising portions of the query string;
comparing substrings of the query string with substrings in the index, and finding an exact match of a substring of the query string with a substring in the index;
designating at least one candidate string based on said comparing;
wherein said designating of at least one candidate string comprises designating a string in the index as a candidate string when a substring thereof represents an exact match with a substring of the query string;
verifying whether each candidate string satisfies the edit distance threshold; and
outputting at least one matching string for each candidate string that satisfies the edit distance threshold;
said creating of substrings corresponding to the strings to be searched against comprising:
    partitioning one of the strings to be searched against into substrings;
    iteratively padding the one of the strings to be searched against with at least one dummy character up to a predetermined maximum number of dummy characters, to produce one or more padded strings; and
    partitioning each of the one or more padded strings into substrings; and
said creating of substrings corresponding to the query string comprising:
    partitioning the query string into substrings;
    iteratively padding the query string with at least one dummy character up to the predetermined maximum number of dummy characters, to produce and one or more padded strings of the query string; and
    partitioning each of the one or more padded strings of the query string into substrings.

* * * * *